Jan. 4, 1966  J. REINES  3,228,002
PARALLEL INPUT EXTREME SIGNAL INDICATOR HAVING
A CONTROL IMPEDANCE IN A COMMON CURRENT PATH
Filed Feb. 2, 1961
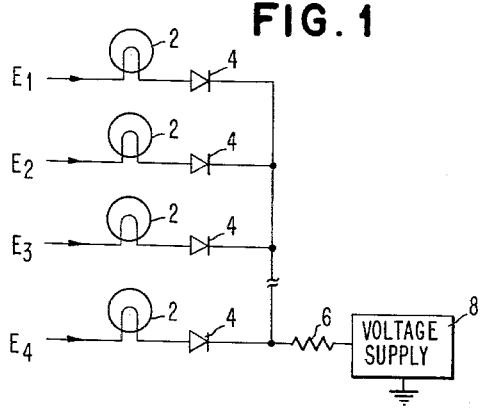
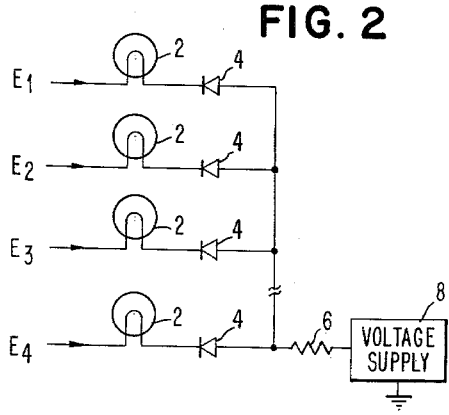
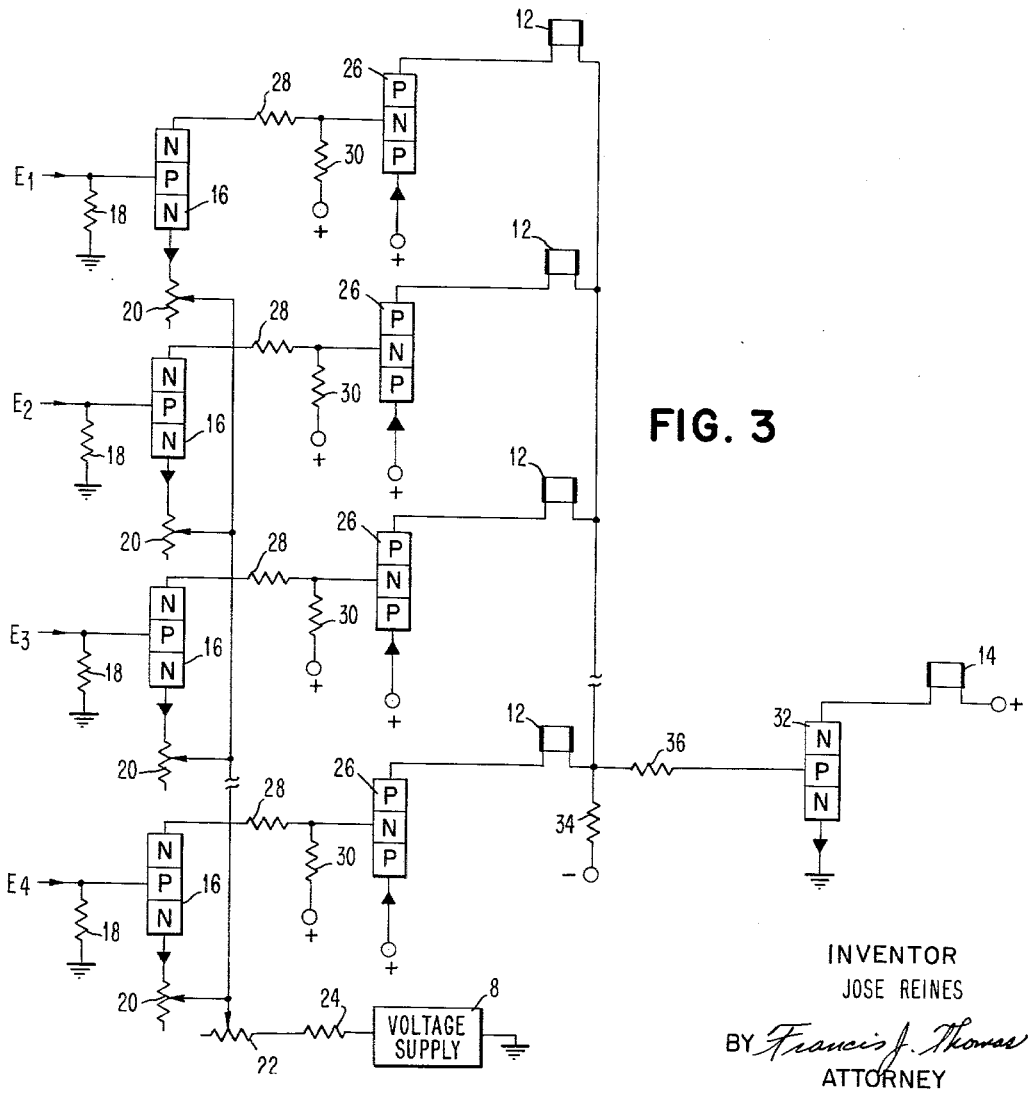
INVENTOR
JOSE REINES
BY *Francis J. Thomas*
ATTORNEY

United States Patent Office 3,228,002
Patented Jan. 4, 1966

3,228,002
PARALLEL INPUT EXTREME SIGNAL INDICATOR HAVING A CONTROL IMPEDANCE IN A COMMON CURRENT PATH
Jose Reines, Crompond, N.Y., assignor to International Business Machines Corporation, New York, N.Y., a corporation of New York
Filed Feb. 2, 1961, Ser. No. 86,753
2 Claims. (Cl. 340—149)

This invention relates to extreme signal indicators and, in particular, to devices for providing an indication of the most positive or most negative of a plurality of input signals.

An extreme signal indicator is required in a large variety of systems and apparatus, including identification systems where the specimen to be identified is compared to a group of references and signals are generated dependent upon the results of the comparisons. In these cases it is necessary to determine which of these signals is the largest in order to provide an indication of the identity of the specimen. Among the various known techniques for indicating the largest of a group of signals are those making use of analog subtracters, such as difference amplifiers. In these devices, each input voltage is subtracted from the remaining input voltages and the one input voltage which is larger than the remaining voltages is determinable by an analysis of the signs of the results of the subtractions. Using this type of extreme signal indicator, the number of subtracters required equals $n(n-1)$ for $n$ input signals. The number of subtracters required increases rapidly as the number of inputs increases. The amount of circuitry required in the present invention is proportional to the number of inputs, making the system considerably less expensive and simpler than those systems using analog subtracters.

One object of this invention is to show apparatus for indicating the extreme signal of a plurality of input signals.

More particular objects are to show devices for indicating the most positive or most negative of a plurality of input signals.

Other objects are to show extreme signal indicating devices utilizing a plurality of current paths containing asymmetrically-conducting devices and a common current path containing an impedance, wherein the current in any of the plurality of current paths also flows in the common current path.

A further object of this invention is to provide an extreme signal indicating device that is economical and simple in construction.

The foregoing and other objects, features and advantages of the invention will be apparent from the following more particular description of preferred embodiments of the invention, as illustrated in the accompanying drawings.

FIGURE 1 is a schematic diagram of an embodiment of an extreme signal indicating device that provides an indication of the most positive of a plurality of input signals.

FIGURE 2 is a schematic diagram of an embodiment of an extreme signal indicating device that provides an indication of the most negative of a plurality of input signals.

FIGURE 3 is a schematic diagram of a second embodiment of an extreme signal indicating device that provides an indication of the most positive of a plurality of input signals.

The extreme signal indicating device shown in FIGURE 1 provides an indication of the most positive of a group of input signals. The input signals are labelled $E_1$, $E_2$, $E_3$, ... $E_n$. The most positive of these signals operates an associated indicating device. In this embodiment, a lamp 2 is caused to glow. The most positive input signal may be negative if the remaining input signals are more negative. Diodes 4 are located in series with the lamps 2 and, in conjunction with a common load resistor 6, permit current to flow only through the lamp that is associated with the most positive input signal. This signal causes current to flow through the common load resistor 6 by way of the associated lamp and diode. The voltage drop across the load resistor back-biases the diodes associated with the less positive input signals, preventing current flow through their associated lamps. The resistor is returned to a voltage from a supply 8 that is more negative (less positive) than the tolerated range of input signals.

The voltage drop across resistor 6 is dependent upon the amplitude of the most positive input signal, the amplitude of the voltage to which the resistor is returned, and the relative resistances of the lamps and the resistor. This determines the sensitivity of the circuit (i.e. the amount that the most positive input signal must exceed the adjacent signal to back-bias the diode associated with the latter signal). The adjacent signal is considered to be the signal that is second most positive. It is desirable that the resistor have a much larger resistance than the individual resistance of the lamps to cause as much as possible of the most positive applied input signal to be dropped across the resistor to back-bias the diodes associated with the less positive input signals, thus preventing all lamps associated with the less positive signals from lighting. If R equals the resistance of resistor 6 and $r$ equals the resistance of a lamp 2 in series with a conducting diode 4, then the smallest ratio between the amplitudes of the most positive input $E_i$ signal and the adjacent input signal $E_j$ that may be tolerated without current flow through the diode associated with the adjacent signal equals $$\frac{R+r}{R}$$

The diode characteristics are such that they conduct when the voltages applied to them exceeds zero (of the appropriate polarity). If the most positive input signal $E_i$ signal causes a current $I_i$ to flow through its associated lamp, then the voltage across the diode associated with the adjacent signal $E_j$ will equal zero when $$E_j = E_i \frac{R}{R+r}$$

where $E_i$ and $E_j$ are measured with respect to the voltage to which the resistor 6 is returned. This relationship may be expressed as $$\frac{E_i}{E_j} = \frac{R+r}{R}$$

Thus a high circuit sensitivity is achieved when R is large with respect to $r$.

Regardless of the size of the resistor (the sensitivity of the system), two or more lamps will light if two or more of the most positive input signals are practically equal. If desired, an indication of two or more lighted lamps may be considered a "reject," indicating that there is no input signal that is substantially more positive than the remaining signals.

This circuit may be used to identify the most negative of a group of signals by reversing the diode connections and returning the resistor 6 to a voltage supply 8 that is more positive (less negative) than the tolerated range of input signals as shown in FIGURE 2.

The lamps may be replaced by relay coils, if desired, and the contacts of the operated relay then used to control an output device.

The extreme signal indicating device shown in FIGURE 3 provides an indication of the most positive input signal. In this embodiment the most positive input signal causes its associated relay 12 to operate. An additional relay 14 is provided and is operated when two or more of the largest signals are practically equal, to indicate a reject.

The input signals are applied to the base connections of a group of NPN type transistors 16. Each transistor base circuit includes a resistor 18 to protect the transistor in the case of a disconnected input signal. The emitter-base connection of the transistors provides a diode action similar to that sown in FIGURE 1 by diodes 4. Each transistor 16 emitter circuit contains a potentiometer 20. The moving contacts of the potentiometers are electrically connected to the moving contact of a common load potentiometer 22 which is in series with a fixed resistor 24. The potentiometer 22 and resistor 24 provide the function of the common load resistor 6 in the embodiment of FIGURE 1.

In the embodiments shown in FIGURES 1 and 2, it was seen that the value of the common load resistor affected the sensitivity of the system. The sensitivity of the embodiment shown in FIGURE 3 is made adjustable by the provision of a potentiometer 22. Potentiometers 20 are used to provide a constant and equal emitter resistance for all of the transistors 16 regardless of the setting of potentiometer 22. As the common resistance in the emitter circuits is varied by a change in the setting of potentiometer 22, the settings of potentiometers 20 are changed in the opposite direction to maintain a constant total emitter resistance. Potentiometers 20 may be controlled simultaneously with control of potentiometer 22 by the use of a common shaft. The minimum common resistance in the emitter circuit is determined by fixed resistor 24. A voltage supply 8 which provides an output that is more negative than the tolerated range of input signals is electrically connected to one terminal of resistor 24 and serves the same function as the supply 8 as described with respect to FIGURE 1. If the resistance of resistor 24 is labelled $R_{24}$, the active resistance of potentiometer 22 is labelled $R_{22}$, the active resistance of a potentiometer 20 is labelled $R_{20}$, and the emitter-base resistance of a transistor 16 is labelled $R_{16}$, then the smallest ratio between the amplitudes of the most positive signal $E_i$ and the adjacent signal $E_j$ that may be tolerated without indicating a reject is approximately:

$$\frac{E_i}{E_j} = \frac{R_{16} + R_{20} + R_{22} + R_{24}}{R_{22} + R_{24}}$$

($E_i$ and $E_j$ are measured with respect to the voltage generated by supply 8). Only the transistor associated with the most positive input signal is permitted to conduct if the most positive signal exceeds the adjacent signal by an amount greater than the sensitivity of the system.

The output of the conducting transistor 16 is applied to an associated PNP transistor switch 26 which, in turn, provides current to operate the relay 12 associated with the largest input signal. A group of resistors 28 provide protection for transistors 16 and 26. A second group of resistors 30 provide a path for leakage current in the base circuits of transistors 26.

A reject circuit containing a transistor 32 and the reject relay 14 operates when the largest two or more applied signals are approximately equal. This condition causes two or more of the relays 12 to operate. Transistor 32 is ordinarily non-conducting due to the negative voltage at its base (which is equal to the supply voltage applied to resistor 34 less the voltage drop across the resistor). When two or more relays 12 are operated simultaneously, a sufficient current flows in resistor 34 to provide a voltage to the base of transistor 32 which is above its cut-off value and the transistor conducts, operating relay 14. The circuit will provide an indication of the most negative input signal if the PNP transistors are replaced with NPN transistors and the NPN transistors are replaced with PNP transistors. (The voltage supply 8 most be more positive than the tolerated range of input signals.)

The following chart indicates the characteristics of the circuit components for the embodiment shown in FIGURE 3 that were found to provide satisfactory operation for input signals in the range include $+1$ to $+12$ volts:

| Components: | Description |
| --- | --- |
| Resistors 18 | 68,000 ohms. |
| Resistors 24 | 470 ohms. |
| Resistors 26 | 100 ohms. |
| Resistors 30 | 6,800 ohms. |
| Resistors 34 | 6,200 ohms. |
| Potentiometers 20 | 1,000 ohms. |
| Potentiometers 22 | 1,000 ohms. |
| Transistors 16 | 2N587. |
| Transistors 26 | 2N158. |
| Supply voltage to resistor 34 | 18 volts. |
| Supply voltage to resistor 30 | +25.5 |
| Supply voltage to emitters of transistors 26 | +25.0. |
| Supply voltage to relay 14 | +25.0. |
| Relays 12, 14 | Potter & Brumfield type KCP–11, DPDT. |

The invention shown and described above provides a simple and economical maximum signal indicator. The embodiment shown and described in respect to FIGURE 3 is more sensitive than the embodiments shown and described with respect to FIGURES 1 and 2 and has the additional advantage of having a separate reject circuit and a controllable reject level. Each of the embodiments shown requires a number of components that increases linearly with respect to the number of inputs applied to the circuit. This is an extremely important feature in circuits to which many inputs are applied.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for providing an indication of the identity of the extreme signal of a plurality of $n$ input signals comprising, in combination: a plurality of transistors; a plurality of $n$ current paths, each including the emitter-base current path of one of said plurality of $n$ transistors; another current path, including a voltage source and an impedance, connected to all of said plurality of $n$ current paths causing the current in all of said plurality of $n$ current paths to flow through said impedance generating a back-biasing signal to cause the asymmetrically-conducting impedances corresponding to all input signals except the most extreme input signal to hinder the flow of current in their respective paths; a plurality of $n$ switching devices, each controlled by the collector current of one of said plurality of $n$ transistors; a reject switching device controlled by said plurality of $n$ switching devices such that the reject switching device is operated when more than one of said plurality of $n$ switching devices is operated; and means for applying each of said plurality of $n$ input signals to a corresponding one of said plurality of $n$ current paths; whereby the switching device corresponding to the extreme signal of said plurality of $n$ input signals is operated.

2. An apparatus for providing an indication of the identity of the extreme signal of a plurality of $n$ input signals comprising, in combination: a first plurality of $n$ transistors; a first plurality of $n$ current paths, each including the emitter-base current path of one of said first plurality of $n$ transistors and each including a variable impedance; a first common current path, including a voltage supply and a variable reject control impedance, connected to all of said first plurality of $n$ current paths causing the current in all of said first plurality of $n$ current paths to flows through said variable impedance generating a back-biasing signal to cause the asymmetrically-conducting impedances corresponding to all input signals except the most extreme input signal to hinder the flow of current in their respective paths; a second plurality of $n$ transistors; means coupled to the collector circuit of each of said first plurality of $n$ transistors to the base circuits to one of said second plurality of $n$ transistors; a second plurality of $n$ current paths, each including an output indicating device and each coupled to the collector circuits of one of said second plurality of $n$ transistors; a second common current path including an impedance connected to all of said second plurality of $n$ current paths such that the current in all of said second plurality of $n$ current paths flows through said impedance; a reject control transistor with a base circuit coupled to said second common current path; a reject indicating device coupled to the collector circuit of said reject control transistor and operative when the current in said second current path exceeds a predetermined value; and means for applying each of said plurality of $n$ input signals to a corresponding one of said first plurality of $n$ current paths, whereby an output indicating device is operated when one input signal is substantially more extreme than any other input signal and whereby more than one output indicating device and the reject indicating device is operated when one input signal is not substantially more extreme than any other input signal.

References Cited by the Examiner

UNITED STATES PATENTS

| | | | |
|---|---|---|---|
| 2,658,167 | 11/1953 | Harris | 328—148 |
| 2,691,151 | 10/1954 | Toulon | 340—166 |
| 2,783,453 | 2/1957 | Rose | 340—149 |
| 2,848,685 | 8/1958 | Mondschein | 340—147 |
| 2,858,438 | 10/1958 | Merrill | 340—149 |
| 2,888,578 | 5/1959 | Bruce et al. | 307—88.5 |
| 3,092,732 | 6/1963 | Milford. | |
| 3,103,646 | 9/1963 | Scheaffer et al. | 340—149 |

OTHER REFERENCES

Electronic Analog Computers (by Korn et al.), second edition, 1956, pages 296–299.

NEIL C. READ, *Primary Examiner.*

STEPHEN W. CAPELLI, *Examiner.*

K. E. JACOBS, L. A. HOFFMAN, H. I. PITTS,
*Assistant Examiners.*